(12) United States Patent
Yang

(10) Patent No.: US 7,787,617 B2
(45) Date of Patent: Aug. 31, 2010

(54) COMMUNICATION TERMINAL

(75) Inventor: Shi-Jun Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 138 days.

(21) Appl. No.: 12/206,726

(22) Filed: Sep. 8, 2008

(65) Prior Publication Data
US 2009/0316883 A1 Dec. 24, 2009

(30) Foreign Application Priority Data
Jun. 18, 2008 (CN) .................... 2008 2 0301208 U

(51) Int. Cl.
H04M 1/00 (2006.01)
H04M 9/00 (2006.01)

(52) U.S. Cl. ............................ 379/433.07; 379/433.03

(58) Field of Classification Search ................. 379/419, 379/433.03, 433.06, 433.07; 381/360, 369, 381/361, 355, 356, 359; 181/171, 158, 166; 455/575.1
See application file for complete search history.

(56) References Cited

U.S. PATENT DOCUMENTS
2006/0293091 A1* 12/2006 Hawker et al. ........... 455/575.1
* cited by examiner Primary Examiner—Tuan D Nguyen
(74) Attorney, Agent, or Firm—Frank R. Niranjan

(57) ABSTRACT

An exemplary communication terminal includes a main body, a cover, and a keypad. The main body has a triggering area and a microphone boot near the triggering area. The cover defines an opening and a sound inlet near the opening. The keypad contacts the triggering area and is exposed from the opening. The keypad is integrated with a rib extending from an extremity thereof, along with a sealing gasket formed at a distal end of the rib. The sealing gasket abuts the cover and defines a through hole therein aligned with the sound inlet to form a sound passage towards the microphone boot. The microphone boot is extended into the through hole of the sealing gasket.

5 Claims, 1 Drawing Sheet

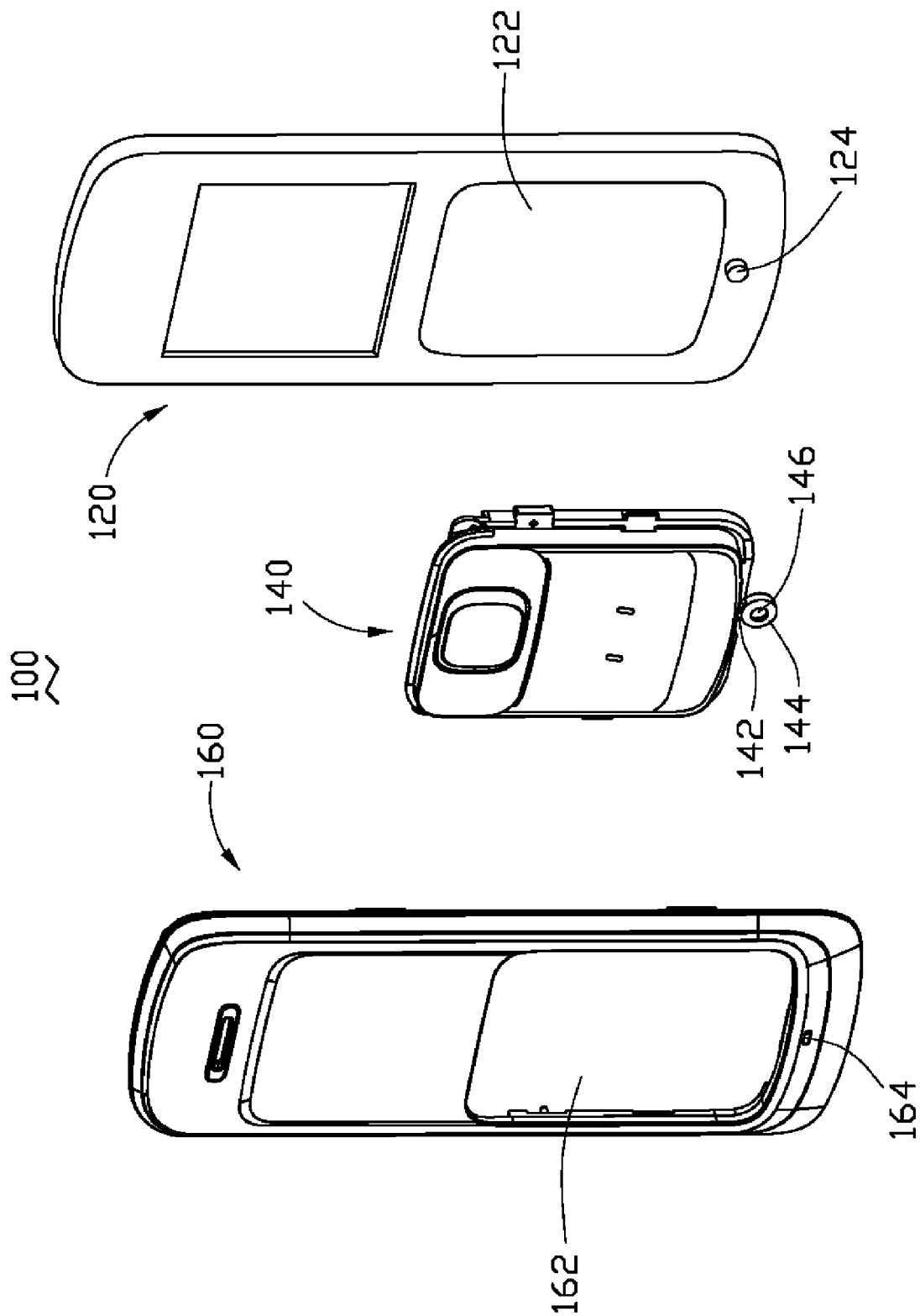

COMMUNICATION TERMINAL

BACKGROUND

1. Field of the Invention

The present invention relates to communication devices and, particularly, to a communication terminal.

2. Description of Related Art

Communication terminals are in widespread use. To enhance the sound quality of a microphone in a communication terminal, a sealing gasket is employed between the microphone and the sound inlet of the cover in the communication terminal. However, the sealing gasket is small in size, which makes accurately position it in a desired location. As a result, it is inconvenient to assemble the sealing gasket to the communication terminal.

What is needed, therefore, is a communication terminal that can overcome the above-described deficiency.

SUMMARY

An exemplary communication terminal includes a main body, a cover, and a keypad. The main body has a triggering area and a microphone boot near the triggering area. The cover defines an opening and a sound inlet near the opening. The keypad contacts the triggering area and is exposed from the opening. The keypad is integrated with a rib extending from an extremity thereof, along with a sealing gasket formed at a distal end of the rib. The sealing gasket abuts the cover and defines a through hole therein aligned with the sound inlet to form a sound passage towards the microphone boot. The microphone boot extends into the through hole of the sealing gasket.

Other advantages and novel features of the present invention will become more apparent from the following detailed description of an embodiment/embodiments when taken in conjunction with the accompanying drawings, in which:

BRIEF DESCRIPTION OF THE DRAWINGS

The FIGURE is an exploded, isometric view of a communication terminal in accordance with an exemplary embodiment.

DETAILED DESCRIPTION OF THE EMBODIMENTS

Referring to the FIGURE, a communication terminal 100 in accordance with an embodiment of the present invention includes a main body 120, a keypad 140 and a cover 160. The keypad 140 is placed between the main body 120 and the cover 160.

The main body 120 has a triggering area 122 triggering communication terminal 100 function, and a microphone boot 124 near a bottom portion of the triggering area 122. In the embodiment, the microphone boot 124 perpendicularly protrudes from a bottom portion of the main body 120.

The keypad 140 contacts the triggering area 122, and has a rib 142 extending from an extremity thereof and a sealing gasket 144 formed at a distal end of the rib 142. The sealing gasket 144 defines a through hole 146 at a central portion thereof, functioning as an extension of the microphone boot 124. In the embodiment, the rib 142 triggering a bottom extremity of the keypad 140. The sealing gasket 144 and the rib 142 are integrated with the keypad 140, by, for example, molding.

The cover 160 defines an opening 162 exposing the keypad 140, and a sound inlet 164 near the opening 162. The sound inlet 164 is aligned with the through hole 146.

After the communication terminal 100 is assembled, the keypad 140 is placed between the main body 120 and the cover 160. The microphone boot 124 is inserted into the through hole 146 of the sealing gasket 144 and the sealing gasket 144 abuts the cover 160. The aligned sound inlet 164 and the through hole 146 form a sound passage toward the microphone boot 124, which collects sound signals entering the sound inlet 164 into the microphone boot 124.

In the embodiment, the sealing gasket 144 and the rib 142 are integrated with the keypad 140. Once the keypad 140 is positioned in the communication terminal 100, the sealing gasket 144 is effectively positioned in place.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A communication terminal comprising:
    a main body comprising a triggering area and a microphone boot near the triggering area;
    a cover defining an opening and a sound inlet near the opening; and
    a keypad contacting the triggering area and exposed by the opening, the keypad being integrated with a rib extending from an extremity thereof and a sealing gasket formed at a distal end of the rib, the sealing gasket abutting the cover and defining a through hole therein aligned with the sound inlet to form a sound passage toward the microphone boot, the microphone boot being extended into the through hole of the sealing gasket.

2. The communication terminal as claimed in claim 1, wherein the microphone boot is located near a bottom portion of the triggering area, and the rib triggering a bottom extremity of the keypad.

3. The communication terminal as claimed in claim 1, wherein the microphone boot protrudes perpendicular from a bottom portion of the main body.

4. The communication terminal as claimed in claim 1, wherein the sealing gasket and the rib are integrated with the keypad by molding.

5. The communication terminal as claimed in claim 1, wherein the through hole is defined in a central portion of the sealing gasket.

\* \* \* \* \*